Patented May 2, 1944

2,347,966

UNITED STATES PATENT OFFICE 2,347,966

SOFTENING RUBBER

Richard O. Roblin, Jr., Old Greenwich, Conn., assignor to American Cyanamid Company, New York, N. Y., a corporation of Maine No Drawing. Application April 30, 1941, Serial No. 391,095

6 Claims. (Cl. 260—761)

This invention relates to the treatment of rubber and more particularly to a method of treating rubber to obtain a product of increased softness or plasticity.

It is known to mill the crude rubber in the presence of oxygen, e. g., air. The milling causes a softening or breakdown of the rubber which facilitates the subsequent processing (calendering, tubing, etc.) of the rubber or compounded rubber.

It is an object of the present invention to provide a process for accelerating the rate of breakdown of unvulcanized rubber and for increasing its plasticity. It is a further object to provide an unvulcanized rubber of increased plasticity. It is an additional object to provide a new class of rubber plasticizing agents.

The foregoing objects may be accomplished in accordance with my invention by subjecting the unvulcanized rubber to the action of a small amount of a higher fatty acid salt of S-substituted thiourea, as by milling the unvulcanized rubber therewith for a short time. These salts may be represented by the following general formula:

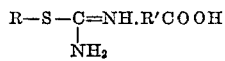

in which R is an alkyl radical containing at least three carbon atoms or an aromatic substituted alkyl radical, and R'COOH is a fatty acid of at least 10 carbon atoms such as capric, lauric, myristic, palmitic, stearic, oleic, etc. The alkyl radical may be saturated or unsaturated, branched or unbranched, or cyclic.

The fatty acid salts of the substituted isothioureas may be prepared by reacting the sodium or potassium salt of the fatty acid with the desired S-substituted isothiourea hydrobromide or hydrochloride, in a suitable solvent, methods for their preparation being described in more detail in the literature [see Donleavy, J. Amer. Chem. Soc. 58, 1004-5 (1936); Veibel and Lillelund, Bull. Soc. Chimique, Series 5, 1153-58 (1938)]. Methods for the preparation of the intermediate S-substituted isothiourea halides are also described in the literature [see Johnson and Sprague, J. Amer. Chem. Soc. 58, 1348-51 (1936) and 59, 1837-40 (1937)].

The activity of the compounds as plasticizers appears to be modified to a large extent by the substituent attached to the S-atom of the isothiourea nucleus. The preferred compounds are the higher fatty acid salts of S-(1-methylheptyl) isothiourea such as S-(1-methylheptyl) isothiourea stearate.

For maximum gain in plasticity, the plasticizing agent is added to the rubber as early as possible in the milling operation, such as just after the preliminary milling or knitting together of the rubber, and preferably in the absence of compounding ingredients, especially sulfur.

In general, the amount of plasticizing agent to be added will not be much above about 1% on the weight of the rubber, for example, about 0.375%. Larger amounts may be used if desired but without proportionate increase in plasticizing effect. The plasticizing agents may be used singly, or more than one may be added to the rubber either separately or in admixture.

The plasticizing agents will be more effective at elevated temperatures, e. g., above about 50° C. Any temperature to which rubber may be heated without detrimental effect may be used, for example up to about 160° C.

The invention is further illustrated by the following specific examples to which, however, it is not to be limited. The softening effect of the compounds on the rubber in these examples was determined in accordance with a modification of the well-known Zimmerman and Cooper method, Ind. & Eng. Chem. 20, 812 (1928). The plasticity measurements were made in a Williams plastometer at 100° C. using a 3 minute "Y" value.

*Example 1*

Four hundred and twenty grams of smoked sheet rubber was placed on a 12 inch mill, the rolls of which had an initial temperature of 95° C. After milling for 5 minutes, 20 grams of the rubber was removed for purposes of the test and to the 400 grams on the mill was added 1.5 grams (0.375%) of a S-long chain isothiourea caprate (the long chain substituent had the approximate composition 3.4% decyl, 59% lauryl, 22% myristyl, 11.2% palmityl, and 4.2% stearyl). Milling of this rubber was resumed for an additional 5 minutes. The percentage increase in softness of the rubber due to the action of the plasticizing agent was 16.3.

*Example 2*

Following the procedure of Example 1, 1.5 grams of S-(1-methylheptyl) isothiourea stearate was milled into the rubber. The percentage increase in softness of the rubber due to the action of the plasticizing agent in this instance was 16.3.

Additionally illustrative of plasticizing agents of the present invention are: S-(1-naphthylmethyl) isothiourea caprate; S-(1,2,3,4-tetrahydro-5-naphthylmethyl) isothiourea caprate; S-n-propyl isothiourea stearate; S-isopropyl isothiourea stearate; S-n-butyl isothiourea stearate; S-isobutyl isothiourea stearate; S-sec. butyl isothiourea stearate; S-t-butyl isothiourea stearate; S-n-amyl isothiourea stearate; S-isoamyl thiourea stearate; S-n-hexyl isothiourea stearate; S-(1-methylhexyl) isothiourea stearate; S-(2-ethylbutyl) isothiourea stearate; S-(1,3-dimethylbutyl) isothiourea stearate; S-n-heptyl isothiourea stearate; S-n-octyl isothiourea stearate; S-(2-methylhexyl) isothiourea stearate; S-sec. undecyl (1-methyl-4-ethyloctyl) isothiourea stearate; S-n-lauryl isothiourea stearate; S-sec. dodecyl (Shell Dev. Co.) isothiourea stearate; S-cetyl isothiourea stearate; S-sec. heptadecyl (1,3-ethylamyl-4-ethyloctyl) isothiourea stearate; S-stearyl isothiourea stearate; S-allyl isothiourea stearate; S-cyclohexyl isothiourea stearate; S-β-phenylethyl) isothiourea stearate, and S-benzyl isothiourea stearate.

The softened or plasticized rubber of the present invention may be compounded and vulcanized in known or other suitable manner. Because of the reduction in time of mechanical working afforded by the process of this invention the rubber treated thereby, in general, will give vulcanized stocks of better physical properties, e. g., tensile, than rubber not so treated.

Rubber cements of lower viscosity may be obtained by dissolving in a solvent unvulcanized rubber which has been plasticized with a softening agent of the present invention.

Suitable variations and changes in the invention may be made without departing from the spirit thereof or the scope of the following claims.

I claim:

1. A process of increasing the plasticity of rubber which comprises, subjecting unvulcanized rubber to the action of a small amount of an isothiourea compound of the following general formula:

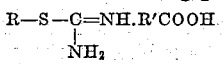

in which R is a radical selected from the group consisting of alkyl radicals containing at least 3 carbon atoms and aromatic substituted alkyl radicals and R'COOH is a fatty acid containing at least 10 carbon atoms, for a time sufficient to effect an increase in plasticity of the rubber over that which the rubber would have if subjected to the same conditions in the absence of said compound.

2. A process in accordance with claim 1, in which R is 1-methylheptyl.

3. A process in accordance with claim 1, in which the compound is S-(1-methylheptyl) isothiourea stearate.

4. Rubber obtained by subjecting unvulcanized rubber to the action of a small amount of an isothiourea compound of the following general formula:

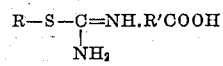

in which R is a radical selected from the group consisting of alkyl radicals containing at least 3 carbon atoms and aromatic substituted alkyl radicals and R'COOH is a fatty acid of at least 10 carbon atoms, for a time sufficient to effect an increase in plasticity of the rubber over that which the rubber would have if subjected to the same conditions in the absence of said compound.

5. Rubber obtained by subjecting unvulcanized rubber to the action of a small amount of an isothiourea compound of the following general formula:

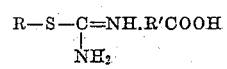

in which R is 1-methylheptyl and R'COOH is a fatty acid of at least 10 carbon atoms, for a time sufficient to effect an increase in plasticity of the rubber over that which the rubber would have if subjected to the same conditions in the absence of said compound.

6. Rubber obtained by subjecting unvulcanized rubber to the action of a small amount of S-(1-methylheptyl) isothiourea stearate, for a time sufficient to effect an increase in plasticity of the rubber over that which the rubber would have if subjected to the same conditions in the absence of said compound.

RICHARD O. ROBLIN, Jr.